US010146968B2

(12) United States Patent
Suzuki (10) Patent No.: US 10,146,968 B2
(45) Date of Patent: Dec. 4, 2018

(54) READING DEVICE, SERVER DEVICE, AND PROGRAM

(71) Applicant: TOSHIBA TEC KABUSHIKI KAISHA, Tokyo (JP)

(72) Inventor: Shigeaki Suzuki, Gotenba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/626,654

(22) Filed: Jun. 19, 2017

(65) Prior Publication Data

US 2018/0025187 A1    Jan. 25, 2018

(30) Foreign Application Priority Data

Jul. 21, 2016    (JP) .................................. 2016-143094

(51) Int. Cl.

| G06K 5/00 | (2006.01) |
| G06K 7/10 | (2006.01) |
| H03M 13/09 | (2006.01) |
| G06F 11/10 | (2006.01) |
| G08C 17/02 | (2006.01) |
| G07G 1/00 | (2006.01) |

(52) U.S. Cl.
CPC .......... *G06K 7/10009* (2013.01); *G06F 11/10* (2013.01); *G06K 7/10376* (2013.01); *G07G 1/009* (2013.01); *G08C 17/02* (2013.01); *H03M 13/09* (2013.01)

(58) Field of Classification Search
CPC ..... G06K 7/10009; G06F 11/10; G08C 17/02; H03M 13/09
USPC .................................. 235/437, 385, 462.13
See application file for complete search history.

(56) References Cited

U.S. PATENT DOCUMENTS

| 2006/0049250 A1* | 3/2006 | Sullivan ............... G06K 7/0008 235/385 |
| 2008/0093448 A1* | 4/2008 | de la Huerga ........ G06F 19/327 235/385 |

FOREIGN PATENT DOCUMENTS

JP              4964567 B2      7/2012

* cited by examiner

*Primary Examiner* — Karl D Frech
(74) *Attorney, Agent, or Firm* — Patterson & Sheridan, LLP (57) ABSTRACT

A reading apparatus includes a control unit and an interface through which the control unit transmits an output request to an electronic tag and receives tag information output from the electronic tag in response to the output request. The control unit is configured to read the tag information received by the reception unit and extract an identifying code from the tag information, store the identifying code in association with a number corresponding to a total number of times tag information including the identifying code has been read by the controller in response to the output request, and output a stored identifying code or information associated with the stored identifying code if the number associated with the stored identifying code meets or exceeds a threshold value.

20 Claims, 11 Drawing Sheets

READING DEVICE, SERVER DEVICE, AND PROGRAM

This application is based upon and claims the benefit of priority from Japanese Patent Application No. 2016-143094, filed Jul. 21, 2016, the entire contents of which are incorporated herein by reference.

FIELD

Embodiments described herein relate generally to a reading device, a server device, and a program.

BACKGROUND

A Radio Frequency Identification (RFID) reading device reads information stored in a RFID tag, or the like. Such a RFID reading device uses an error detection technique to detect errors introduced during transmission from the RFID tag to the RFID reading device, and an error correction technique to reconstruct (error correct) the data as originally transmitted. In the error detection technique, such as a cyclic redundancy code (CRC), the RFID tag sends data and attaches redundancy data, which the RFID reading device subsequently uses to determine whether or not the data is corrupted.

However, both the original data and the error corrected data may be corrupted in some cases. In such cases, the reading device is not able to detect the error even by using the error detection technique. Therefore, the reading device may sometimes read erroneous data without recognizing that the data is erroneous. Therefore, the reading device sometimes processes erroneous data and produces an erroneous result.

DETAILED DESCRIPTION

In general, according to one embodiment, a reading apparatus includes a control unit and an interface through which the control unit transmits an output request to an electronic tag and receives tag information output from the electronic tag in response to the output request. The control unit is configured to read the tag information received by the reception unit and extract an identifying code from the tag information, store the identifying code in association with a number corresponding to a total number of times tag information including the identifying code has been read by the controller in response to the output request, and output a stored identifying code or information associated with the stored identifying code if the number associated with the stored identifying code meets or exceeds a threshold value.

Hereinafter, example embodiments of a reading device, a server device, and a program will be described with reference the drawings. These examples are used for the purposes of illustrations only. Accordingly, the scope of the disclosure should not be considered limited to those specific example embodiments.

First Embodiment

According to a first embodiment, a reading system 1 reads tag information and error detection and correction (EDC) information from a Radio Frequency Identification (RFID) tag attached to merchandise to be sold at a retail store such as a supermarket. Here, the tag information contains an RFID code and a merchandise code. The RFID code is identification information capable of identifying the particular RFID tag associated with the RFID code. The merchandise code is capable of identifying particular merchandise or merchandise type. The EDC information is for detecting and correcting errors in tag information. For example, the EDC information is used in a technique such as Cyclic Redundancy Code (CRC).

Figure 1:
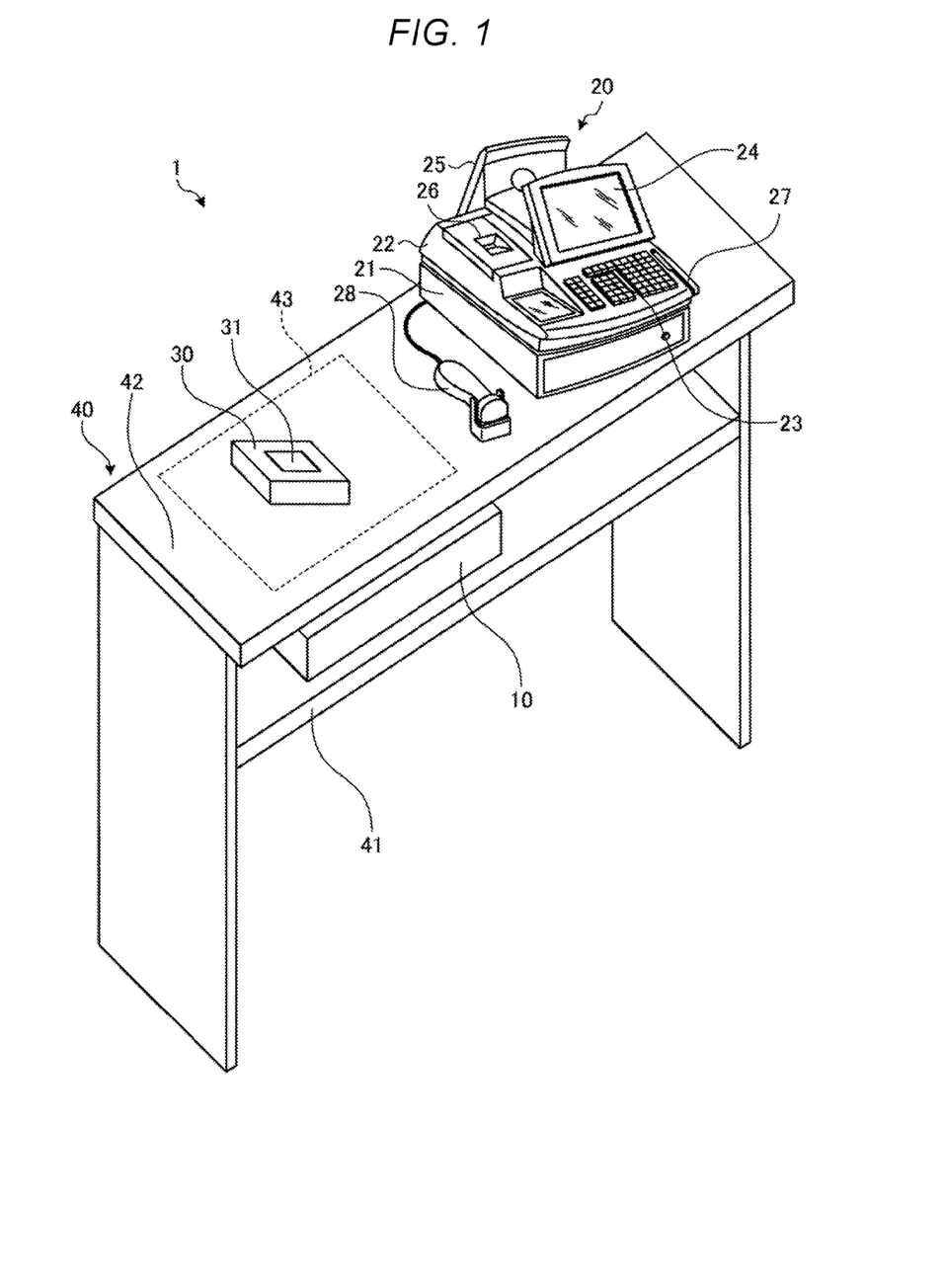
FIG. 1 is a diagram showing aspects of a reading system according to a first embodiment.

FIG. 1 is a diagram showing an example of the reading system 1 according to the first embodiment. The reading system 1 includes a fixed (stationary) reading device 10 and a point-of-sale (POS) terminal 20. The fixed reading device 10 is a stationary reading device that reads a radio frequency signal that includes tag information and EDC information transmitted from an RFID tag 31 attached to an article of merchandise 30. The tag information includes a RFID tag code for identifying the RFID tag 31 and a merchandise code for identifying the merchandise 30. The RFID tag 31 is an electronic tag outputting tag information and EDC information stored in a storage unit of the RFID tag 31 (not shown when an information output request is received by a short-range wireless communication. The POS terminal 20 is an information processing apparatus that performs sales registration of the merchandise 30. The reading device 10 and the POS terminal 20 are connected so as to communicate with each other. The POS terminal 20 can receive the tag information from the reading device 10 after the tag information has been read from the RFID tag 31 and then register the merchandise code included in the tag information as part of a sales transaction.

The counter table 40 includes a top plate 42 and a partition plate 41 that partitions the space inside the counter table 40. Here, the POS terminal 20 is placed on the top plate 42. The partition plate 41 is parallel to the top plate 42 and may be a shelf on which items can be placed inside the counter table 40. The fixed reading device 10 can be located on the partition plate 41. More specifically, the fixed reading device 10 is placed at a position that is not overlapping with the POS terminal 20 when seen from above the counter table 40.

The top plate 42 is made of a material that passes radio waves such as, for example, wood. A merchandise placement area 43 for reading the RFID tag 31 is located on the top plate 42 above the fixed reading device 10. The fixed reading device 10 reads the tag information and EDC information output from the RFID tag 31 attached to a merchandise 30 that is in the merchandise placement area 43. It should be noted that the radio wave intensity of the fixed reading device 10 is set in advance so as not avoid reading a RFID tag 31 located outside of the merchandise placement area 43.

The POS terminal 20 in this example includes a drawer 21 and a main unit 22 placed on the drawer 21. The drawer 21 stores cash received from customers and cash used for making change. In some embodiments, the POS terminal 20 may be provided with an automatic change device instead of a drawer 21 or in addition to a drawer 21.

The main unit 22 includes a keyboard 23 and a first display unit 24 on the upper right side. The keyboard 23 includes various keys or buttons for operating the POS terminal 20. For example, the keyboard 23 includes a closing key for finalizing a retail transaction.

The first display unit 24 is a touch panel type liquid crystal display (LCD) in which a touch panel is stacked on the display surface. The first display unit 24 displays a screen which an operator of the POS terminal 20, such as a salesperson of a store, can see. The first display unit 24 is not limited to a liquid crystal display (LCD) device, but may be an organic electroluminescent (EL) display (OLED) device or the like. The main unit 22 further includes a second display unit 25 on the upper rear side. The second display unit 25 is a touch panel type liquid crystal display (LCD) in which a touch panel is stacked on a display surface. The second display unit 25 displays a screen that, for example, a customer can see. The second display unit 25 is not limited to a liquid crystal display (LCD) device, but may be an organic electroluminescent (EL) display device or the like.

The main unit 22 is provided with a printer 26 on the upper left side. The printer 26 prints receipts of sales transactions and records sales transactions.

The main unit 22 is provided with a card reader/writer in a groove on the right side surface. The card reader/writer 27 scans a card to read card information from the card.

The POS terminal 20 also includes a hand-held scanner device 28. The scanner device 28 optically reads an appearance of an article or a code symbol (e.g., barcode) attached to the merchandise 30.

Next, the hardware configurations of the stationary reading device 10 and the POS terminal 20 in the reading system 1 will be described.

Figure 2:
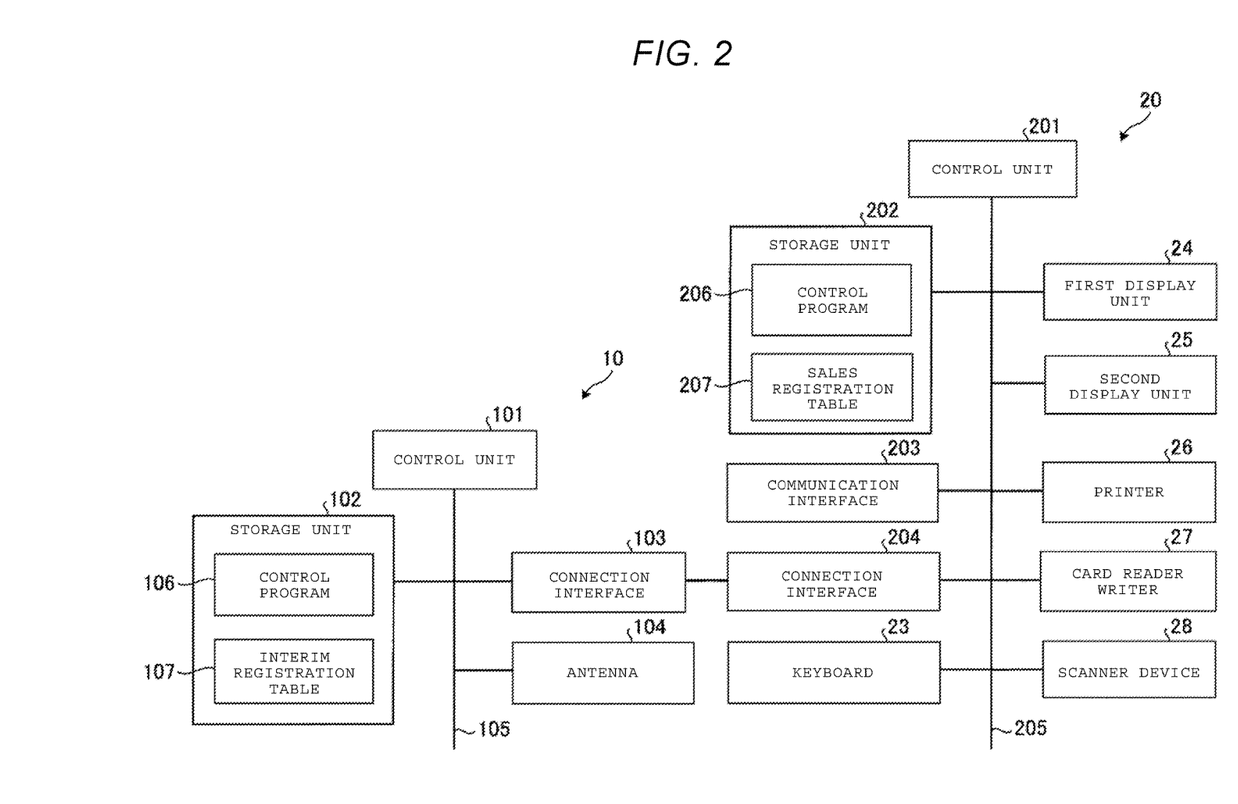
FIG. 2 is a block diagram showing aspects of a reading system including a fixed reading device and a point-of-sale (POS) terminal.

FIG. 2 is a block diagram showing the reading system 1 including the fixed reading device 10 and the POS terminal 20. The fixed reading device 10 includes a control unit 101, a storage unit 102, a connection interface 103, and an antenna 104. The control unit 101, the storage unit 102, the connection interface 103, and the antenna 104 are connected to each other through a system bus 105.

The control unit 101 controls operations of the fixed reading device 10 so as to realize various functions of the fixed reading device 10. The control unit 101 includes a central processing unit (CPU), a read only memory (ROM), a random access memory (RAM). The CPU controls each of the units of the fixed reading device 10. The ROM is a primary storage medium (memory) for storing various programs and data. The RAM is another memory used as a work area for temporarily storing the various programs, or for rewriting various types of data by the CPU as necessary. The CPU executes programs stored in the ROM or the storage unit 102 and temporarily written to the RAM from the ROM or the storage unit 102.

The storage unit 102 is a storage device such as a hard disk drive (HDD) or a solid state drive (SSD). The storage unit 102 stores a control program 106 and an interim registration table 107. The control program 106 is an operating system, or a program for exerting functions that the stationary reading device 10 has. The control program 106 includes a program for implementing functions according to the embodiment.

The interim registration table 107 is a data table for storing information received from the RFID tag 31 attached to a merchandise 30 that has been placed in the merchandise placement area 43.

Figure 3:
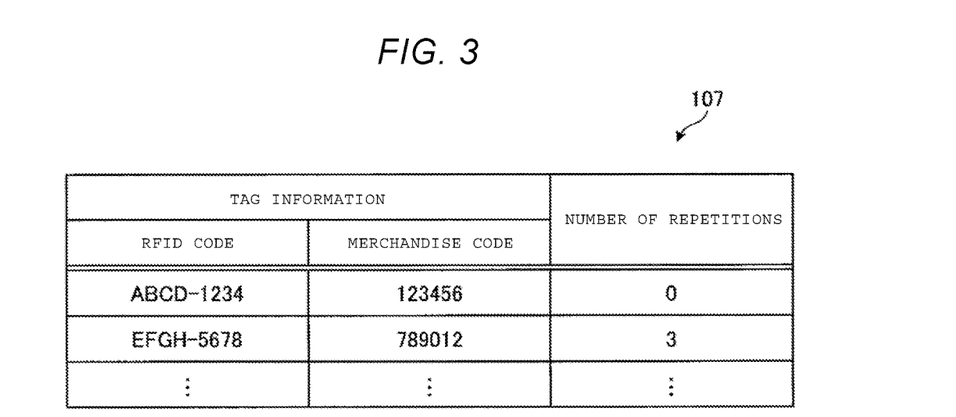
FIG. 3 is an explanatory diagram showing aspects of a data structure of an interim registration table.

Here, FIG. 3 is an explanatory diagram showing an example of a data structure of an interim registration table 107. The interim registration table 107 stores particular tag information and a number of repeated reading (repetitions) in association with each other. The tag information includes an RFID code and a merchandise code. The RFID code is included in the tag information read from the RFID tag 31 attached to an item of merchandise 30 placed in the merchandise placement region 43. The merchandise code is included in the tag information read from the RFID tag 31 in the merchandise placement region 43. In interim registration table 107, it is possible to register more than one item of merchandise 30 (including those of the same type) by storing a RFID code (which may be unique to each RFID tag 31) and a merchandise code in association with each other. The stored number of repetitions indicates how many times particular tag information has been received by the fixed reading device 10 during repeated readings.

The connection interface 103 is a hardware interface by which the connection interface 103 is connected to the POS terminal 20 for communication therewith.

The antenna 104 transmits and receives radio frequency signals to and from the RFID tag 31 attached to an article of merchandise 30 placed in the merchandise placement area 43, by short-range wireless communication or the like. That is, the antenna 104 transmits and receives radio waves by limiting radio wave intensity to prevent transmission and/or reception from an RFID tag 31 outside the merchandise placement region 43

The POS terminal 20 includes a control unit 201, a storage unit 202, a communication interface 203, a connection interface 204, a keyboard 23, a first display unit 24, a second display unit 25, a printer 26, a card reader writer 27, and a scanner device 28. Here, the control unit 201, the storage unit 202, the communication interface 203, the connection interface 204, the keyboard 23, the first display unit 24, the second display unit 25, the printer 26, the card reader writer 27, and the scanner device 28 are connected to each other through a system bus 205.

The control unit 201 controls the operation of the entire POS terminal 20 so as to realize various functions of the POS terminal 20 The control unit 201 includes a CPU, a ROM, and a RAM. The CPU controls each of the units of the POS terminal 20. The ROM is a primary storage medium (memory) for storing various programs and data. The RAM is another memory used as a work area for temporarily storing the various programs, or for rewriting various types of data by the CPU as necessary. The CPU executes programs temporarily written in the RAM from the ROM or the storage unit 202.

The storage unit 202 is a storage device such as a HDD or an SSD. The storage unit 202 stores the control program 206 and a sales registration table 207.

The control program 206 is an operating system or a program for implementing or controlling functions of the POS terminal 20.

The sales registration table 207 is a data table in which retail transaction details are registered. For example, the sales registration table 207 registers the merchandise code, included in the tag information received by the fixed reading device 10, the barcode information read by the scanner device 28, and the like.

The communication interface 203 is a physical interface that connects the POS terminal 20 to a network.

The connection interface 204 is a physical interface that connects the POS terminal 20 to the stationary reading device 10.

Figure 4:
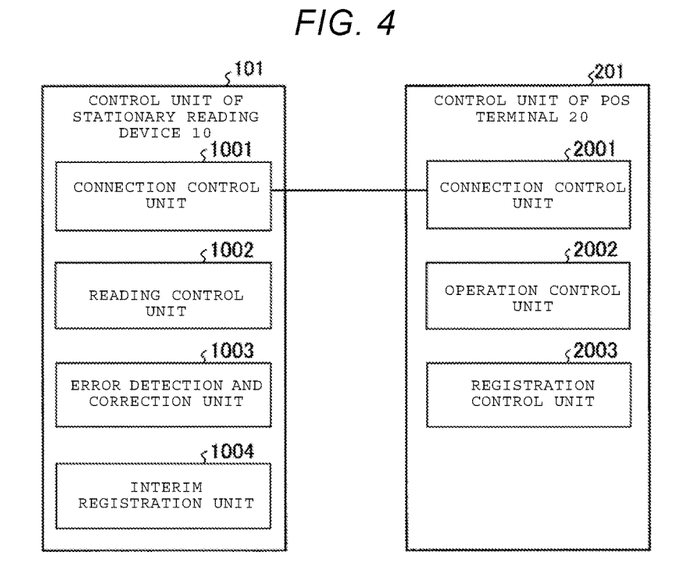
FIG. 4 is a block diagram showing aspects of a control unit of a fixed reading device and a control unit of a POS terminal included in a reading system.

Next, a characteristic functional configuration that each device of the reading system 1 has will be described. Here, FIG. 4 is a block diagram showing the control unit 101 of the fixed reading device 10 and the control unit 201 of the POS terminal 20 included in the reading system 1.

The control unit 101 of the fixed reading device 10 executes the control program 106 to perform various functions of the fixed reading device 10. Specifically, the control unit 101 of the fixed reading device 10 is programmed to function as a connection control unit 1001, a reading control unit 1002, an error detection and correction unit 1003, and an interim registration unit 1004.

The connection control unit 1001 controls the connection interface 103 to control communication with the POS terminal 20. For example, the connection control unit 1001 receives, from the POS terminal 20, a read start request to start reading the RFID tag 31. Further, the connection control unit 1001 receives a read stop request from the POS terminal 20 to stop reading the RFID tag 31. In addition, the connection control unit 1001 receives a request (a transmission request) for the merchandise code from the POS terminal 20. In addition, the connection control unit 1001 cooperates with the interim registration unit 1004 to transmit the merchandise code and the number of registrations thereof to the POS terminal 20.

The reading control unit 1002 in combination with antenna 104 functions as a transmission unit and a reception unit in the present embodiment. Specifically, the reading control unit 1002 controls the antenna 104 to read tag information and error detection and correction information from a RFID tag 31 attached to the merchandise 30. More specifically, the reading control unit 1002 transmits an interrogation signal to interrogate a RFID tag 31, upon receiving the read start request from the POS terminal 20. The reading control unit 1002 reads the tag information and the error detection and correction information transmitted from the RFID tag 31 in response to the interrogation signal. The reading control unit 1002 stops the transmission of an interrogation signal upon receiving the read stop request from the POS terminal 20. That is, the reading control unit 1002 transmits interrogation signals until the reading control unit 1002 receives a read stop request from the POS terminal 20.

If the reading control unit 1002 receives the tag information and error detection and correction information from the RFID tag 31, the error detection and correction unit 1003 executes an error detection and correction process on the tag information. That is, the error detection and correction unit 1003 detects garbled bits and corrects the garbled bit using the received error detection and correction information. Here, an error or garbled bit refers to a corrupted bit or portion of the tag information read from the RFID tag 31.

The interim registration unit 1004 functions as a counting unit in the present embodiment. Specifically, the interim registration unit 1004 registers the tag information, after the error detection and correction process, in the interim registration table 107. That is, the interim registration unit 1004 registers tag information that has been read and, if necessary, corrected in the interim registration table 107. Furthermore, the interim registration unit 1004 counts the number of times (repetitions) the particular tag information has been received. Specifically, in this example, the interim registration unit 1004 stores "0" in the table column "number of repetitions" in the interim registration table 107, when the particular tag information is registered in the interim registration table 107 for the first time. The interim registration unit 1004 then increments (e.g., changes "0" to "1" to "2" . . . ) the value stored in the "number of repetitions" column of the interim registration table 107 each time the particular tag information already registered in the interim registration table 107 is received.

Furthermore, the interim registration unit 1004, together with the connection control unit 1001, functions as an output unit in the present embodiment. Specifically, the interim registration unit 1004 extracts, from the interim registration table 107, the tag information associated with a number of repetitions equal to or greater than some threshold value, when transmission of tag information has been requested by the POS terminal 20. The interim registration unit 1004 causes the connection control unit 1001 to transmit the information meeting or exceeding the threshold number of repetitions as a reading result from the RFID tag 31. That is, the interim registration unit 1004 may cause the connection control unit 1001 to transmit both the RFID code and the merchandise code, or may transmit just the merchandise code.

As described above, the interim registration unit 1004 prevents incorrect tag information from being transmitted and output since the connection control unit 1001 transmits only the tag information having a number of repetitions equal to or larger than the threshold value. Specifically, when a bit has been garbled in both the tag information and the error detection and correction information, the interim registration unit 1004 could register incorrect (corrupted) tag information into the interim registration table 107 in some cases. However, since it is unlikely that the same bit will be repeatedly garbled in error detection and correction information, the interim registration unit 1004 is unlikely to register this same incorrect tag information into the interim registration table 107 more than once. Therefore, the interim registration unit 1004 causes the connection control unit 1001 to transmit only tag information from the interim registration unit 1004 having the required number of repetitions equal to or larger than a threshold level, thereby preventing incorrect information from being transmitted.

The control unit 201 of the POS terminal 20 executes the control program 206 temporarily written in the RAM from the storage unit 202, and controls each of the units of the POS terminal 20, as shown in FIG. 4, to perform various functions of the POS terminal 20. Specifically, the control unit 201 includes a connection control unit 2001, an operation control unit 2002, and a registration control unit 2003.

The connection control unit 2001 controls the connection interface 204 to control the communication with the fixed reading device 10. For example, the connection control unit 2001 cooperates with the registration control unit 2003 to transmit a read start request (requesting the starting of the reading of the RFID tag 31) to the fixed reading device 10. Furthermore, the connection control unit 2001 cooperates with the registration control unit 2003 to transmit a reading stop request (requesting the stopping of the reading of the RFID tag 31) to the fixed reading device 10. In addition, the connection control unit 2001 cooperates with the registration control unit 2003 to transmit a transmission request for tag information to the fixed reading device 10. In addition, the connection control unit 2001 receives tag information and the number of repetitions thereof from the fixed reading device 10.

The operation control unit 2002 controls the keyboard 23, the touch panel located on the first display unit 24, the touch panel located on the second display unit 25, and the like to receive various operations by an operator of the POS terminal 20.

The registration control unit 2003 registers, in the sales registration table 207, an input of a merchandise code for the merchandise 30 being sold in a retail transaction. More specifically, when the operation control unit 2002 receives an instruction from the operator to start reading the merchandise code, the registration control unit 2003 causes the connection control unit 2001 to transmit a read start request. In addition, after the operation control unit 2002 receives an instruction to start reading the merchandise code, the registration control unit 2003 causes the connection control unit 2001 to transmit a transmission request for tag information after a predetermined period has elapsed. When the operation control unit 2002 receives an instruction to stop reading the tag information, the registration control unit 2003 causes the connection control unit 2001 to transmit a read stop request. When the connection control unit 2001 receives tag information and the number of repetitions thereof, the registration control unit 2003 registers, in the sales registration table 20,7 only tag information having an associated number of repetitions equal to or larger than the threshold value. That is, the registration control unit 2003 stores, in the sales registration table 207, the merchandise code of the merchandise 30 as read by the fixed reading device 10 from a RFID tag 31 attached to an item of merchandise 30 that has been placed in the merchandise placement area 43 as a part of a retail transaction.

Figure 5:
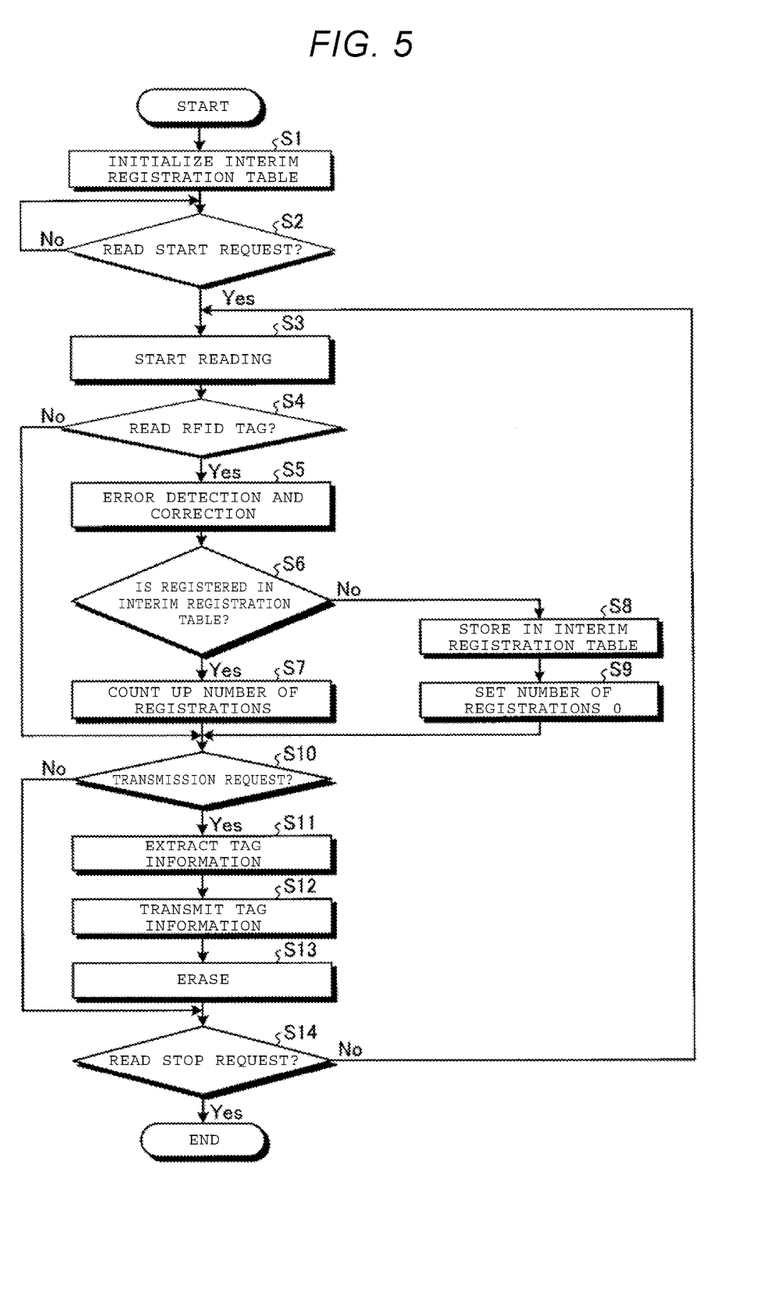
FIG. 5 is a flowchart of a reading process.

FIG. 5 is a flowchart of a reading process executed by the fixed reading device 10 in the first embodiment. A reading process is the process of reading a merchandise code from a RFID tag 31 attached to a merchandise 30. The reading process can be stopped or started according to requests from the POS terminal 20.

First, the interim registration unit 1004 initializes the interim registration table 107 (step S1). That is, the interim registration unit 1004 erases any tag information previously stored in the interim registration table 107. The interim registration unit 1004 sets 0 as the initial number of repetitions in the interim registration table 107.

The connection control unit 1001 determines whether or not a read start request of the RFID tag 31 has been received from the POS terminal 20 (step S2). If the read start request has not been received (step S2; No), the fixed reading device 10 is in a standby mode until the read start request is received.

If the connection control unit 1001 determines that a read start request has been received (step S2; Yes), the reading control unit 1002 starts reading the RFID tag 31 (step S3).

The reading control unit 1002 determines whether or not tag information and error detection and correction information has been received from the RFID tag 31 (step S4). That is, the reading control unit 1002 determines whether or not the tag information and the error detection and correction information have been read from the RFID tag 31. If the tag information and the error detection and correction information has not been received from the RFID tag 31 (step S4; No), the reading control unit 1002 proceeds to step S10.

If the tag information and the error detection and correction information have been received from the RFID tag 31 (step S4; Yes), the reading control unit 1002 proceeds to step S5. In step S5, the error detection and correction unit 1003 executes an error detection and correction process on the tag information that has just been received by using the just received error detection and correction information (step S5). The interim registration unit 1004 determines whether or not the received tag information on which the error detection and correction process has been executed is already registered in the interim registration table 107 (step S6).

The interim registration unit 1004 counts up the number of repetitions of the tag information in the interim registration table 107 (step S7), if the tag information has already been registered in the interim registration table 107 (step S6; Yes) at least once.

On the other hand, if the tag information has not yet been registered in the interim registration table 107 (step S6; No), then the interim registration unit 1004 registers this tag information in the interim registration table 107 (step S8). The interim registration unit 1004 sets 0 as the number of repetitions for this tag information in the interim registration table 107 (step S9) on its first instance of reception.

The connection control unit 1001 then determines whether or not a transmission request for tag information has been received from the POS terminal 20 (step S10). If a transmission request has not been received (step S10; No), the connection control unit 1001 proceeds to step S14.

If a transmission request has been received (step S10; Yes), the interim registration unit 1004 extracts, from the interim registration table 107, any tag information having a number of repetitions that is at least one and also the number of repetitions (step S11). Next, the connection control unit 1001 associates the tag information with the corresponding number of repetitions (as extracted in step S11), and transmits the tag information to the POS terminal 20 (step S12).

The interim registration unit 1004 then erases the tag information and the associated number of repetitions transmitted from the interim registration table 107 (step S13). That is, the interim registration unit 1004 erases, from the interim registration table 107, the tag information having a number of repetitions of one or more. In addition, the interim registration unit 1004 sets the number of repetitions of the tag information to 0 in the interim registration table 107.

Subsequently, the connection control unit 1001 determines whether or not a read stop request of the RFID tag 31 has been received from the POS terminal 20 (step S14). If a read stop request has not been received (step S14; No), the connection control unit 1001 proceeds to step S3.

If a read stop request has been received (step S14; Yes), the fixed reading device 10 ends the reading process.

Figure 6:
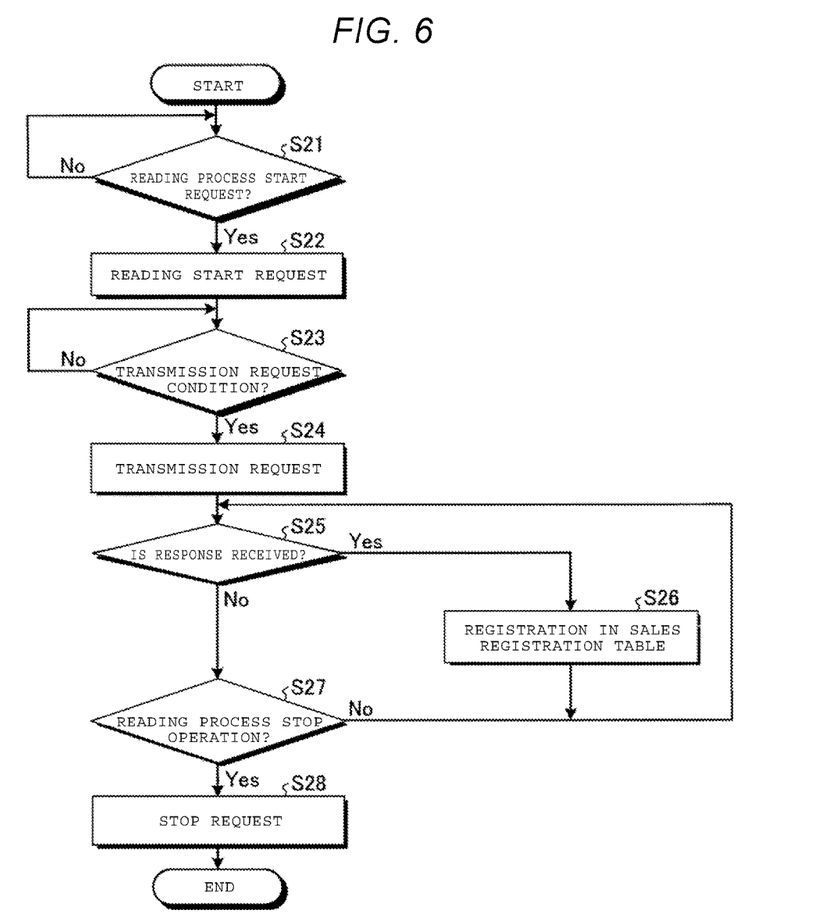
FIG. 6 is a flowchart of a registration process.

FIG. 6 is a flowchart of a registration process executed by the POS terminal 20 in the first embodiment.

The operation control unit 2002 determines whether or not an instruction to start the reading process by the fixed reading device 10 has been received (step S21). If the operation to start the reading process has not been received (step S21; No), the POS terminal 20 is on standby until the instruction is received.

If an instruction to start the reading process has been received (step S21; Yes), the connection control unit 2001 transmits a read start request to the fixed reading device 10 (step S22).

The registration control unit 2003 determines whether or not a condition for transmitting a transmission request for tag information and the associated number of repetitions, as read by the stationary reading device 10 from the RFID tag 31, has been satisfied (step S23). For example, the registration control unit 2003 determines that the condition for transmitting the transmission request has been satisfied when a predetermined time period has elapsed. If the condition for transmitting the transmission request has not been satisfied (step S23; No), the POS terminal 20 remains on standby until the condition is satisfied.

If the condition for transmitting the transmission request has been satisfied (step S23; Yes), the connection control unit 2001 transmits a transmission request for tag information to the fixed reading device 10 (step S24).

The connection control unit 2001 determines whether or not tag information (and a number of repetitions) has been received in response to the previous transmission request (step S25). If the tag information with the number of repetitions has been received (step S25; Yes), the registration control unit 2003 registers, in the sales registration table 207, the merchandise code in the tag information with a number of repetitions equal to or larger than the threshold value (step S26). Then, the POS terminal 20 returns to step S25.

If the tag information and the number of repetitions has not been received (step S25; No), the operation control unit 2002 determines whether or not an instruction requesting the stop of the reading process has been received (step S27). If the instruction to stop the reading process has not been received (step S27; No), the POS terminal 20 proceeds to step S25.

If the instruction requesting the stopping of the reading process has been received (step S27; Yes), the connection control unit 2001 transmits a stop request to the POS terminal 20 (step S28).

The POS terminal 20 then ends the reading process.

As described above, according to the reading system 1 of the first embodiment, the fixed reading device 10 only reads the tag information from the RFID tag 31 attached to an article of merchandise 30 placed in the merchandise placement area 43 because the radio wave signal intensity has been limited. The fixed reading device 10 counts the number of times the tag information has been repeatedly received. The fixed reading device 10 transmits, to the POS terminal 20, a merchandise code with an associated number of repetitions equal to or larger than the threshold value. Then, the POS terminal 20 registers the received merchandise code as a part of a retail transaction. Therefore, the fixed reading device 10 can prevent transmission and subsequent registration of erroneous data (tag information).

Second Embodiment

Figure 7:
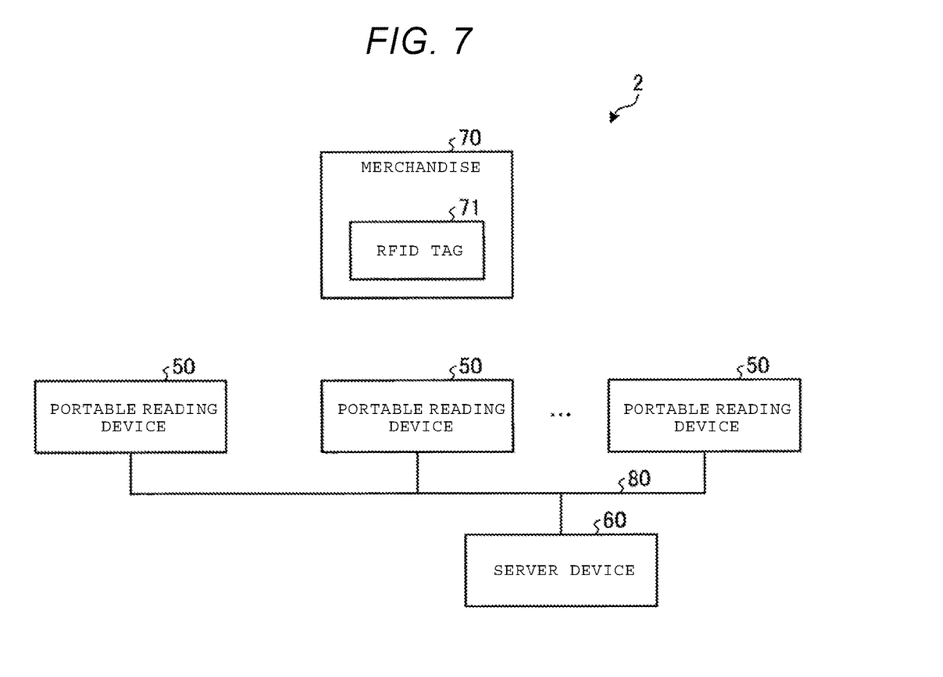
FIG. 7 is a diagram showing aspects of a reading system according to a second embodiment.

In the first embodiment, the description of an aspect in which a fixed reading device 10 counts the number of times (repetitions) particular tag information is read/received during a reading process, and then transmits only the tag information having a threshold or greater number of repetitions associated therewith to the POS terminal 20. According to a second embodiment, a description will be made of an aspect in which a number of repetitions of particular tag information, as read by one or more reading devices, is counted by a device other than the reading device. Specifically, in the second embodiment a portable reading device 50 (as shown in FIG. 7) is used. Note that differences from the first embodiment are mainly described, and the components substantially similar to those of the first embodiment have been given the same names and reference symbols, and thus the repeated description thereof may be omitted.

FIG. 7 is an explanatory diagram showing a reading system 2 according to the second embodiment. The reading system 2 reads the tag information and the error detection and correction information from an RFID tag 71 attached to a merchandise 70, which is listed as stock in the stock management system of a warehouse or the like.

The reading system 2 may include and a server device 60 and only one portable reading device 50 or a plurality of portable reading devices 50. A portable reading device 50 is a portable reading device which can be used to read tag information and error detection and correction information that is stored in or provided by a RFID tag 71 that has been attached to items of merchandise 70. That is, the portable reading device 50 reads the tag information along with the error detection and correction information from the RFID tags 71 attached the various merchandise 70 stored on a shelf in a warehouse or the like. The server device 60 is an information processing apparatus that performs stock management in part based on the tag information received from the portable reading device 50. The portable reading device 50 and the server device 60 are communicably connected through a network 80, such as the Internet, a Virtual Private Network (VPN), a Local Area Network (LAN), or the like.

Figure 8:
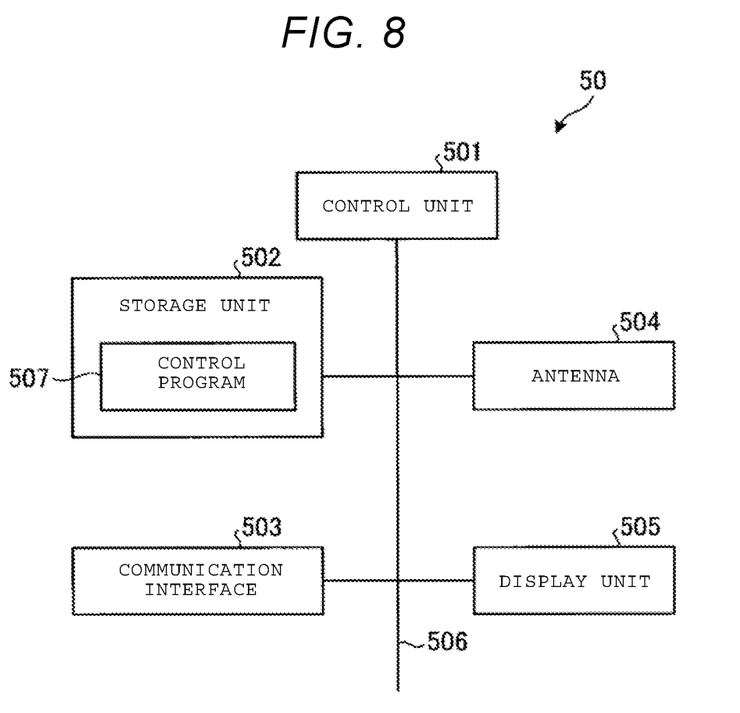
FIG. 8 is a block diagram showing aspects of a portable reading device.

FIG. 8 is a block diagram showing an example of a hardware configuration of the portable reading device 50. The portable reading device 50 includes a control unit 501, a storage unit 502, a communication interface 503, an antenna 504, and a display unit 505. The control unit 501, the storage unit 502, the communication interface 503, the antenna 504, and the display unit 505 are connected to each other through a system bus 506.

The control unit 501 controls the operation of the portable reading device 50 so as to realize various functions. The control unit 501 includes a CPU, a ROM, and a RAM. The CPU controls each of the units of the portable reading device 50. The ROM is a primary storage medium (memory) for storing various programs and data. The RAM is another memory used as a work area for temporarily storing the various programs, or for rewriting various types of data by the CPU as necessary. The CPU executes programs temporarily written in the RAM from the ROM or the storage unit 502.

The storage unit 502 is a secondary storage device (storage) such as a HDD or an SSD. The storage unit 502 stores a control program 507. The control program 507, when implemented by the CPU, controls each of the units of the portable reading device 50 to perform various functions according to the embodiment.

The communication interface 503 is a physical interface that connects the portable reading device 50 to a network 80. That is, the communication interface 503 is an interface for communicating with the server device 60 through the network 80.

The antenna 504 transmits and receives radio frequency signals to and from the RFID tag 71 attached to an article of merchandise 70 placed on a shelf of a warehouse or the like, by short-range wireless communication or the like.

The display unit 505 is a touch panel type liquid crystal display (LCD) in which a touch panel is located on a surface of the display unit 505.

Figure 9:
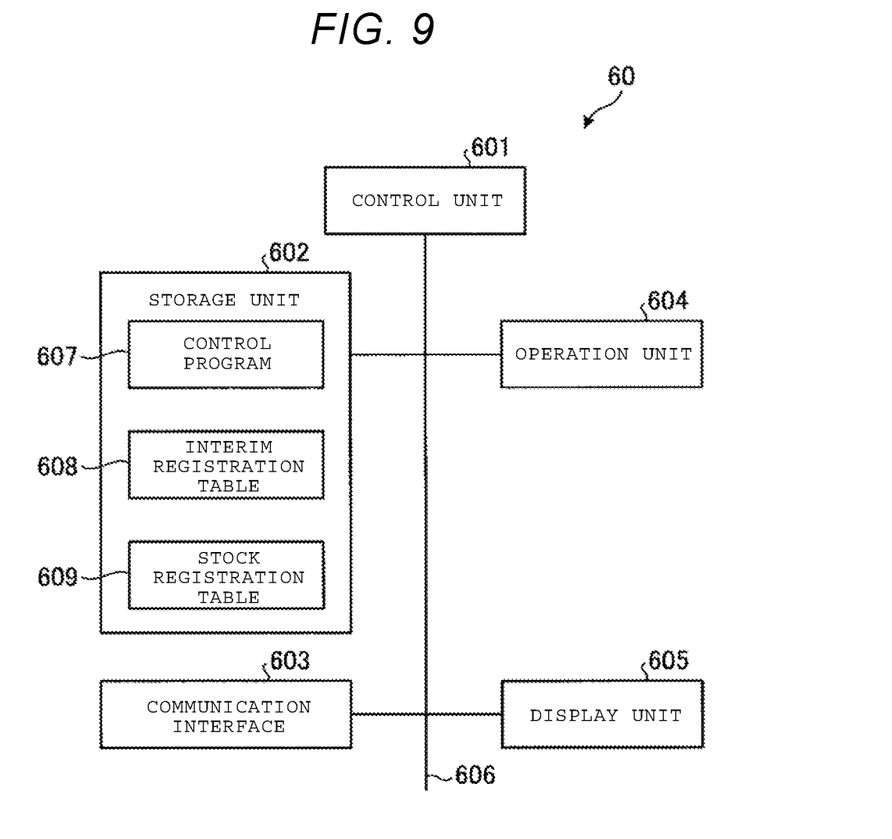
FIG. 9 is a block diagram showing aspects of a server device.

FIG. 9 is a block diagram showing the server device 60. The server device 60 includes a control unit 601, a storage unit 602, a communication interface 603, an operation unit 604, and a display unit 605. The control unit 601, the storage unit 602, the communication interface 603, the operation unit 604, and the display unit 605 are connected to each other through a system bus 606.

The control unit 601 includes a CPU, a ROM, and a RAM. The CPU controls each of the units of the server device 60. The ROM is a primary storage medium (memory) for storing various programs and data. The RAM is another memory used as a work area for temporarily storing the various programs, or for rewriting various types of data by the CPU as necessary. The CPU executes programs temporarily written in the RAM from the ROM or the storage unit 602.

The storage unit 602 is a secondary storage device (storage) such as a HDD or an SSD. The storage unit 602 stores a control program 607, an interim registration table 608, and a stock registration table 609. The control program 607, when executed by the CPU, controls each of the units of the server device 60 to perform various functions according to the embodiment.

The interim registration table 608 is a data table for registering various types of information received from the RFID tags 71. The interim registration table 608 has substantially the same data structure as the interim registration table 107 according to the first embodiment. That is, the interim registration table 608 stores tag information and the associated number of reading repetitions. Here, the tag information includes an RFID code and a merchandise code. The RFID code can be associated with a particular RFID tag 71 attached to a particular merchandise 70. In some embodiments, the interim registration table 608, it is possible to register particular pieces of merchandise 70 of the same type by storing the RFID code and the merchandise code in association with each other. The number of repetitions indicates the number of times in which the tag information has been received.

The stock registration table 609 is a data table for registering a merchandise code or the like of any merchandise 70 or the like in stock at a warehouse or the like. For example, the stock registration table 609 registers the particular merchandise code that was included in the tag information received by the portable reading device 50.

The communication interface 603 is a physical interface that connects the server device 60 to a network 80. That is, the communication interface 603 is an interface for communicating with the portable reading device 50 through the network 80.

The operation unit 604 is an input device such as a keyboard or a mouse. The operation unit 604 receives various instructions from an operator or the like.

The display unit 605 is a liquid crystal display (LCD). The display unit 605 is not limited to a liquid crystal display (LCD) device, but may be an organic electroluminescent (EL) display device or the like.

Figure 10:
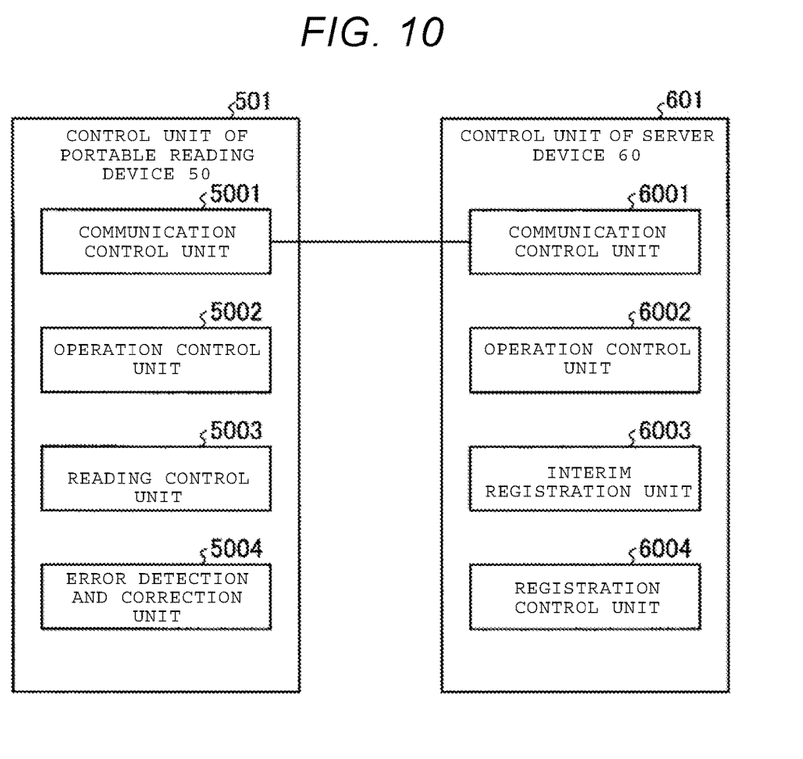
FIG. 10 is a block diagram showing aspects of a control unit of a portable reading device and a control unit of a server device included in a reading system.

FIG. 10 is a block diagram showing the control unit 501 of the portable reading device 50 and the control unit 601 of the server device 60 included in the reading system 2.

The control unit 501 executes the control program 507 temporarily written in the RAM from the storage unit 502 and controls each of the units of the server device 60, as shown in FIG. 10, to perform various functions of the server device 60. Specifically, the control unit 501 of the portable reading device 50 includes a communication control unit 5001, an operation control unit 5002, a reading control unit 5003, and an error detection and correction unit 5004.

The communication control unit 5001 controls the communication interface 503 to control communication with the server device 60. For example, the communication control unit 5001 transmits, to the server device 60, the tag information on which the error detection and correction unit 5004 performs the error detection and correction process.

The operation control unit 5002 controls the touch panel located on the display unit 505 or the like, and receives various operations/instructions from an operator of the portable reading device 50.

The reading control unit 5003 controls the antenna 504 to read the tag information and error detection and correction information from the RFID tag 71, and functions as a transmission unit (a transmitter) and a reception unit (a receiver), similar to the reading control unit 1002 of the fixed reading device 10 according to the first embodiment. Then, the reading control unit 5003 (controller) causes the communication control unit 5001 to transmit the just read tag information, when the tag information and error detection and correction information has been read from the RFID tag 71. The condition for transmitting the tag information is not limited to reading the tag information from the RFID tag 71. For example, the condition for transmitting the tag information may be an elapse of a predetermined period, a request from the server device 60, or reception of an instruction for transmitting tag information from the server device 60. Furthermore, in some embodiments, the portable reading device 50 may have an interim registration table 107 according to the first embodiment provided in the storage unit 502.

The error detection and correction unit 5004 executes an error detection and correction process on the tag information, which the reading control unit 5003 has received from the RFID tag 71, using the received error detection and correction information. That is, the error detection and correction unit 5004 detects garbled bits in the tag information and may correct the garbled bit by using the error detection and correction information.

The control unit 601 of the server device 60 executes the control program 607 temporarily written in the RAM from the storage unit 602, and controls each of the units of the server device 60, shown in FIG. 10, to perform various functions of the server device 60. Specifically, the control unit 601 of the server device 60 includes a communication control unit 6001, an operation control unit 6002, an interim registration unit 6003, and a registration control unit.

The communication control unit 6001 functions as a reception unit in the present embodiment. Specifically, the communication control unit 6001 controls the communication interface 603 to control communication with the portable reading device 50.

The operation control unit 6002 controls the touch panel located on the display unit 605 or the like, and receives various operations by an operator of the server device 60.

The interim registration unit 6003 functions as a storage control unit and an extraction unit in the present embodiment. The interim registration unit 6003 collects the tag information received by the communication control unit 6001 from one or a plurality of portable reading devices 50 and registers the tag information in the interim registration table 608. Further, the interim registration unit 6003 counts the number of repetitions of the tag information. That is, the interim registration unit 6003 counts the number of times the particular tag information has already been received and subsequently stored in the interim registration table 608. The interim registration unit 6003 sets 0 as the initial number of repetitions in the interim registration table 608, when the tag information is first registered in the interim registration table 608. The interim registration unit 6003 increments the number of repetitions in the interim registration table 608, every time the same tag information is received. The interim registration unit 6003 then extracts the tag information having a number of repetitions equal to or larger than a threshold value, if the operation control unit 6002 receives an instruction to stop reading the RFID tag 71.

The registration control unit 6004 registers the tag information of the merchandise 70, extracted by the interim registration unit 6003, in the stock registration table 609.

Figure 11:
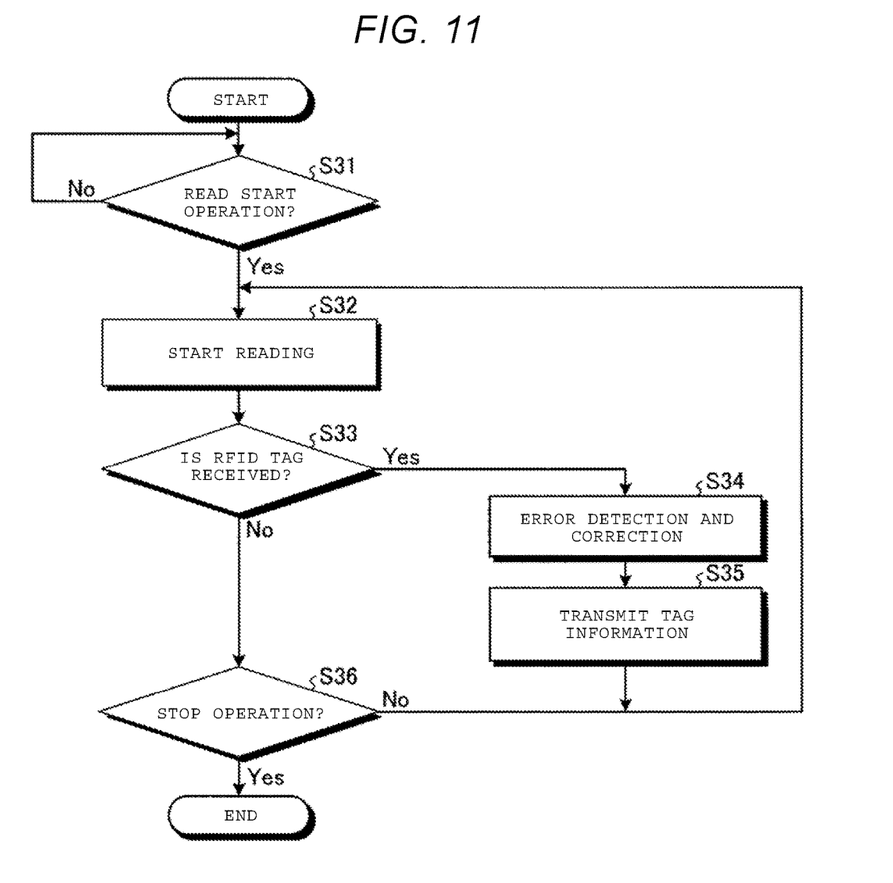
FIG. 11 is a flowchart of a reading process.

FIG. 11 is a flowchart of a reading process executed by the portable reading device 50 in the second embodiment.

First, the operation control unit 5002 determines whether or not an instruction to start reading the RFID tag 71 has been received (step S31). If an instruction to start reading has not been received (step S31; No), the portable reading device 50 is in standby until the instruction is received.

If an instruction to start reading has been received (step S31; Yes), the reading control unit 5003 transmits an interrogation signal to interrogate the RFID tag 71 to start reading the RFID tag 71 (step S32).

The reading control unit 5003 determines whether or not tag information and error detection and correction information have been received from the RFID tag 71 (step S33). If the tag information and the error detection and correction information have been received (step S33; Yes), the error detection and correction unit 5004 executes the error detection and correction process on the received tag information using the received error detection and correction information (step S34). The communication control unit 5001 transmits the tag information after the error detection and correction process has been performed to the server device 60 (step S35). Then, the portable reading device 50 proceeds to step S32 and transmits an output request (interrogation signal).

If the tag information and the error detection and correction information are not received from the RFID tag 71 (step S33; No), the communication control unit 5001 determines whether or not an instruction to stop reading the RFID tag 71 has been received (step S36). If an instruction to stop reading the RFID tag 71 has not been received (step S36; No), the portable reading device 50 proceeds to step S32.

If an instruction to stop reading the RFID tag 71 has been received (step S36; Yes), the portable reading device 50 ends the reading process.

Figure 12:
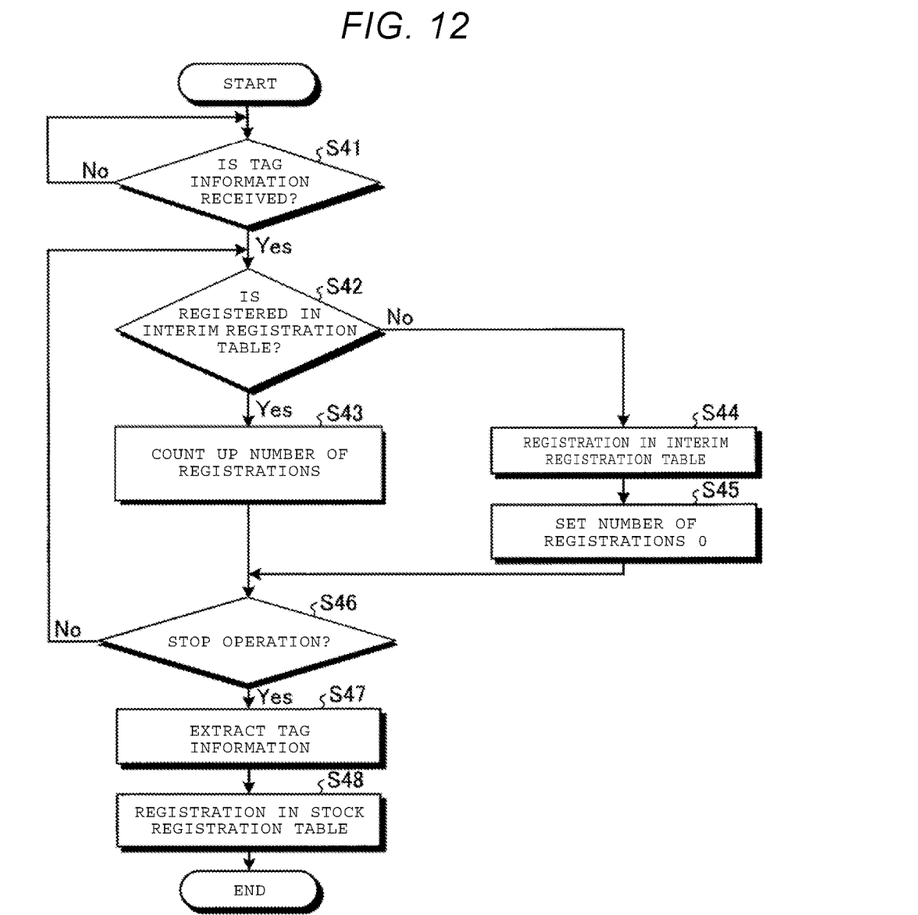
FIG. 12 is a flowchart of a registration process.

FIG. 12 is a flowchart of a registration process executed by the server device 60 in the second embodiment.

The communication control unit 6001 determines whether or not the portable reading device 50 has received the tag information that was read from the RFID tag 71 (step S41). If the tag information has not been received (step S41; No), the server device 60 remains in standby until the tag information is received.

If tag information has been received (step S41; Yes), the interim registration unit 6003 determines whether or not the just received tag information has previously been registered in the interim registration table 608 (step S42).

If the just received tag information has been previously received (and registered in the interim registration table 608) (step S42; Yes), then the interim registration unit 6003 counts up the associated number of repetitions (step S43). That is, the interim registration unit 6003 increases by one the stored number of repetitions associated with the tag information in the interim registration table 608.

If the tag information has not been previously registered in the interim registration table 608 (step S42; No), the interim registration unit 6003 registers the just received tag information in the interim registration table 608 (step S44) and sets 0 as the initial number of repetitions for this tag information in the interim registration table 608 (step S45).

The operation control unit 6002 determines whether or not an instruction to stop reading the RFID tag 71 has been received (step S46). If an instruction to stop reading the RFID tag 71 has not been received (step S46; No), then the server device 60 proceeds to step S42.

If an instruction to stop reading the RFID tag 71 has been received (step S46; Yes), then the registration control unit 6004 extracts, from the interim registration table 608, the tag information having a number of repetitions of one or more (step S47).

The registration control unit 6004 of the server device 60 registers (stores) this extracted tag information in the stock registration table 609 (step S48).

The server device 60 then ends the registration process.

As described above, according to the reading system 2 of the second embodiment, a portable reading device 50 reads the tag information from a RFID tag 71 attached to an article of merchandise 70. The portable reading device 50 then transmits the read tag information (or at least a merchandise code therein) to the server device 60. The server device 60 aggregates the tag information received from portable reading devices 50 and stores the tag information in the interim registration table 608. The server device 60 extracts the merchandise code(s) which have been stored in the interim registration table 608 more than once as the merchandise 70 presently in the warehouse or the like. The server device 60 stores extracted merchandise codes in the stock registration table 609. Therefore, the server device 60 can eliminate the inclusion of erroneous data in the warehouse stock list or the like.

Here, a program executed by each device in the above exemplary embodiments or the modification example has been provided by being stored in advance within a storage medium (a ROM or a storage unit) provided in each device, but the embodiments are not limited thereto. For example, in some embodiments, the program that is executed by each device may be stored in a computer readable recording medium such as a CD-ROM, a flexible disk (FD), a CD-R, and a digital versatile disk (DVD), as a file in an installable form or an executable form. In some embodiments, the storage medium inside the devices includes a storage medium from which a program can be transmitted through a LAN, the Internet, or the like and subsequently downloaded and stored or temporarily stored in the devices.

Further, in some embodiments, the program executed by each device may be stored in a computer connected to a network, and downloaded through the network, and distributed through the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reading apparatus, comprising:
   a control unit; and
   an interface through which the control unit transmits an output request to an electronic tag and receives tag information output from the electronic tag in response to the output request,
   wherein the control unit is configured to:
      read the tag information received by the interface and extract an identifying code from the tag information,
      store the identifying code in association with a number corresponding to a total number of times tag information including the identifying code has been read by the control unit in response to the output request, and output a stored identifying code or information associated with the stored identifying code if the number associated with the stored identifying code meets or exceeds a threshold value, the threshold value being greater than one.

2. The reading apparatus according to claim 1, wherein the interface is a connection interface to which a point-of-sale (POS) terminal is connected, and the control unit transmits the stored identifying code or information associated with the stored identifying code to the POS terminal through the connection interface.

3. The reading apparatus according to claim 1, wherein the electronic tag is a radio frequency identification (RFID) tag.

4. The reading apparatus according to claim 1, wherein the electronic tag is attached to an item of merchandise and the identifying code is a merchandise code.

5. The reading apparatus according to claim 1, wherein the tag information includes a merchandise code corresponding to a type of merchandise to which the electronic tag is attached and a tag code that identifies to the electronic tag.

6. The reading apparatus according to claim 1, wherein the tag information output by the electronic tag is accompanied by an error detection and correction code, and the control unit performs an error detection and correction process on tag information using the error detection and correction code.

7. The reading apparatus according to claim 1, wherein the interface is an antenna, and the control unit wirelessly transmits the output request to the electronic tag through the antenna and wirelessly receives the tag information output from the electronic tag in response to the output request through the antenna.

8. The reading apparatus according to claim 7, further comprising:

a table including a merchandise placement area from which the antenna wirelessly receives the tag information and to which the antenna wirelessly transmits the output request.

9. The reading apparatus according to claim 8, wherein the antenna is configured to receive tag information only from electronic tags inside the merchandise placement area.

10. A server device, comprising:

a communication interface configured to receive tag information transmitted from an electronic tag reading device, each instance of received tag information including an identifying code;

a storage unit configured to store the received tag information; and a controller configured to:

store, in an interim table, the identifying code of the received tag information in association with a number corresponding to a number of times tag information including the identifying code has been received from the electronic tag reading device, and output a stored identifying code or information associated with the stored identifying code if the number of times associated with the stored identifying code meets or exceeds a threshold value, the threshold value being greater than one.

11. The server device according to claim 10, wherein the electronic tag reading device is portable.

12. The server device according to claim 10, wherein the electronic tag reading device is a radio frequency identification (RFID) tag reader.

13. The server device according to claim 10, wherein the communication interface is configured to receive tag information from a plurality of electronic tag reading devices.

14. The server device according to claim 10, wherein the electronic tag reading device performs an error detection and correction process on the tag information before transmitting the tag information.

15. The server device according to claim 10, wherein the controller is further configured to:

register, in a stock registration table, the stored identifying code or the information associated with the stored identifying code if the number associated with the stored identifying code in the interim table meets or exceeds the threshold value.

16. A non-transitory computer readable medium storing program instructions that when executed by a processor causes to a reading apparatus to:

receive tag information output from an electronic tag in response to an output request;

store, in an interim table, an identifying code included in the received tag information in association with a number corresponding to a number of times tag information including the identifying code has been received; and output a stored identifying code or information associated with the stored identifying code if the number of times associated with the stored identifying code meets or exceeds a threshold value, the threshold value being greater than one.

17. The non-transitory computer readable medium according to claim 16, wherein the tag information output by the electronic tag is accompanied by an error detection and correction code, and to the program instructions further cause the processor to perform an error detection and correction process using the error detection and correction code.

18. The non-transitory computer readable medium according to claim 16, wherein the electronic tag is a radio frequency identification (RFID) tag.

19. The non-transitory computer readable medium according to claim 16, wherein the stored identifying code or information associated with the stored identifying code is not output if the number of times associated with the stored identifying code is less than the threshold value.

20. The non-transitory computer readable medium according to claim 16, wherein the stored identifying code or information associated with the stored identifying code is output to a point-of-sale terminal.

* * * * *